US011427296B2

(12) United States Patent
Wesseloh et al.

(10) Patent No.: US 11,427,296 B2
(45) Date of Patent: Aug. 30, 2022

(54) DEVICE FOR FIXING CABIN SIDE WALL PANELING AND CABIN LIGHT PANELING TO A STRUCTURAL COMPONENT OF AN AIRCRAFT AND SPACECRAFT

(71) Applicant: Airbus Operations GmbH, Hamburg (DE)

(72) Inventors: Marc Wesseloh, Hamburg (DE); Volkhard Schulz, Hamburg (DE); Hinnerk Kleinwort, Hamburg (DE); Sergej Marx, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 320 days.

(21) Appl. No.: 16/689,536

(22) Filed: Nov. 20, 2019

(65) Prior Publication Data
US 2020/0172266 A1 Jun. 4, 2020

(30) Foreign Application Priority Data
Dec. 3, 2018 (DE) .......................... 102018130619.9

(51) Int. Cl.
*B64C 1/06* (2006.01)
(52) U.S. Cl.
CPC .................................. *B64C 1/066* (2013.01)
(58) Field of Classification Search
CPC .......... B64C 1/066; F16B 12/10; F16B 12/20; F16B 21/073; F16B 21/06; F16B 5/06; F16B 5/10
(Continued)

(56) References Cited

U.S. PATENT DOCUMENTS

| 2012/0012218 A1* | 1/2012 | Sabadie | H02G 3/32 138/106 |
| 2014/0093312 A1* | 4/2014 | Pacini | F16B 5/0088 403/327 |
| 2014/0197278 A1* | 7/2014 | Cheung | B64C 1/066 244/131 |

FOREIGN PATENT DOCUMENTS

DE          20016889 U1 * 12/2000   ......... B60R 13/0206
DE   10 2009 011904 A1   9/2010
(Continued)

OTHER PUBLICATIONS

German Search Report for Application No. 102018130619.9 dated Sep. 20, 2021.

*Primary Examiner* — Joshua J Michener
*Assistant Examiner* — Ryan Andrew Yankey
(74) *Attorney, Agent, or Firm* — Jenkins, Wilson, Taylor & Hunt, P.A.

(57) ABSTRACT

A device for fixing cabin side wall and cabin light paneling to a structural component of an aircraft and spacecraft includes: a structure holding component; and a cabin side wall holding component. The structure holding component has a surface for fixing the holding component to the structural component, and an adjustable surface for fixing the side wall holding component. The side wall holding component has an intermediate bracket and a side wall receiver for fixing cabin side wall paneling. The intermediate bracket is arranged between the adjustable fixing surface and the side wall receiver. The intermediate bracket has an intermediate guide element which guides the intermediate bracket, and the side wall receiver has a receiver guide element which guides the side wall receiver. The intermediate bracket has a fixing element for locking the intermediate bracket, and the side wall receiver has a fixing element for locking the side wall receiver.

15 Claims, 6 Drawing Sheets

(58) Field of Classification Search
USPC .................. 248/221.11, 222.11, 562, 638
See application file for complete search history.

(56) References Cited

FOREIGN PATENT DOCUMENTS

| DE | 102009011904 A | * | 9/2010 | ................ F16B 5/00 |
| DE | WO 2010100059 A | * | 9/2010 | ............... B64C 1/06 |
| EP | 1193403 A2 | | 4/2002 | |

* cited by examiner

DEVICE FOR FIXING CABIN SIDE WALL PANELING AND CABIN LIGHT PANELING TO A STRUCTURAL COMPONENT OF AN AIRCRAFT AND SPACECRAFT

CROSS-REFERENCE TO PRIORITY APPLICATION

This application claims the benefit of, and priority to, German patent application number 102018130619.9, filed Dec. 3, 2018. The content of the referenced application is incorporated by reference herein.

TECHNICAL FIELD

Embodiments of the subject matter described herein relate generally to a device for fixing cabin side wall paneling to a structural component of an aircraft and spacecraft.

BACKGROUND

Aircraft and spacecraft which may be occupied by persons have wall paneling which is arranged between the outer skin of the aircraft and spacecraft and the actual passenger compartment in the interior of the aircraft and spacecraft. The wall paneling serves to screen mechanical and/or electrical systems of the aircraft and spacecraft from the passenger compartment, or restrict access to these systems. The wall paneling is attached to a structural component of the aircraft and spacecraft by means of fixing devices.

Fixing devices are known which connect individual panels of a wall paneling to the structural component. Thus for example in aircraft, cabin panels are used as wall paneling which cover a region above and below the windows of passenger aircraft. The wall paneling is fixed in a region above the window, at the window itself, and in a region below the window. The wall paneling in the region above the window and at the window is suspended on brackets, and in the area below the window is fixedly connected to the structural component by means of a wall bracket. However, different fixing devices must be used for different types of wall paneling. Furthermore, the known fixing devices do not support an adjustment of the position of cabin panels relative to each other or relative to the structural component.

BRIEF SUMMARY

The object of the disclosure here is to provide an improved device and improved method for fixing cabin side wall paneling and mechanical systems to a structural component of an aircraft and spacecraft.

The object is achieved by the features of the independent claims. Advantageous refinements are the subject of the dependent claims and the description which follows.

The disclosure provides a device for fixing cabin side wall paneling to a structural component of an aircraft and spacecraft, wherein the device comprises: a structure holding component; and a cabin side wall holding component; wherein the structure holding component has a structure fixing surface for fixing the structure holding component to the structural component, and an adjustable fixing surface for fixing the cabin side wall holding component, wherein the cabin side wall holding component has an intermediate bracket and a cabin side wall receiver for fixing at least one cabin side wall paneling, wherein the intermediate bracket is arranged between the adjustable fixing surface and the cabin side wall receiver, wherein the intermediate bracket has an intermediate guide element which guides the intermediate bracket in a first direction relative to the adjustable fixing surface, and the cabin side wall receiver has a receiver guide element which guides the cabin side wall receiver in a second direction relative to the intermediate bracket, wherein the intermediate bracket has a fixing element for locking the intermediate bracket on the adjustable fixing surface, and wherein the cabin side wall receiver has a fixing element for locking the cabin side wall receiver on the intermediate bracket.

The disclosure thus provides a device for fixing cabin side wall paneling to a structural component of an aircraft and spacecraft, which has several components that are displaceable relative to each other. The structure holding component here serves for fixing to the structural component. The cabin side wall holding component here is connected to the structure holding component by means of the intermediate bracket via the adjustable fixing surface. Here, the intermediate bracket has an intermediate guide element on which the intermediate bracket can be moved in a first direction relative to the structure holding component. The first direction may for example be a horizontal direction, i.e. the intermediate bracket can be moved horizontally relative to the structure holding component by means of the intermediate guide element. It is not however excluded that the first direction may also be another direction, for example a vertical direction. By means of a fixing element, the intermediate bracket may be locked on the adjustable fixing surface. In other words, after locking, it is no longer possible for the intermediate bracket to be moved by means of the intermediate guide element relative to the structure holding component. The cabin side wall receiver of the cabin side wall holding component may be attached to the intermediate bracket. The cabin side wall holding component here has a receiver guide element which guides the cabin side wall receiver relative to the intermediate bracket in a second direction with respect to the first direction. If the first direction for example is a horizontal direction, the second direction may for example be a vertical direction or assume any other angle not equal to 0° relative to the first direction. The receiver guide element allows displacement of the cabin side wall holding component relative to the intermediate bracket. By means of a fixing element, the cabin side wall receiver may be locked relative to the intermediate bracket so as to suppress movement in the second direction. The cabin side wall may thus be moved in the second direction also in relation to the structural holding component by means of the receiver guide element. Furthermore, the cabin side wall receiver may be moved in the first direction relative to the structure holding component via the intermediate guide element of the intermediate bracket. Thus the cabin side wall receiver can be moved relative to the structural component of the aircraft and spacecraft in the first direction and in the second direction, to provide an adjustability of the cabin side wall receiver.

A structural component may e.g. be a frame, a crossmember, a stringer or a fixedly installed wall of a cabin element.

According to one example, the intermediate guide element may be formed as a slot which extends in the first direction, wherein the fixing element for locking the intermediate bracket is arranged in the slot and is stationary relative to the adjustable fixing surface.

In this example, the fixing element for locking the intermediate bracket also serves as a fixing point for guiding through the intermediate guide element formed as a slot. The intermediate guide may thus be moved by means of the slot relative to the fixing element and hence relative to the structure holding component. This simplifies handling of the movement and locking of the intermediate bracket on the structure holding component.

According to a further example, the receiver guide element may be formed as a slot which extends in the second direction, wherein the fixing element for locking the cabin side wall receiver is arranged in the slot and is stationary relative to the intermediate bracket.

In this example, the fixing element for locking the cabin side wall receiver also serves as a fixing point for guiding through the receiver guide element formed as a slot. The cabin side wall receiver may thus be moved by means of the slot relative to the fixing element and hence relative to the intermediate bracket. This simplifies handling of the movement and locking of the cabin side wall receiver on the intermediate bracket.

Furthermore, the intermediate bracket may also have a plurality of catch elements which extend transversely to the first direction and lie against the adjustable fixing surface when the intermediate bracket is attached to the adjustable fixing surface.

The catch elements of the intermediate bracket which extend transversely to the first direction act as positioning elements on the adjustable fixing surface and provide discrete positions for the movement of the intermediate bracket relative to the adjustable fixing surface in the first direction. Furthermore, when the intermediate bracket is fixed to the adjustable fixing surface, the catch elements serve to avoid later slipping of the intermediate bracket in the first direction.

Furthermore, the intermediate bracket may have a plurality of catch elements which extend in the first direction and are formed so as to match catch elements on the cabin side wall receiver.

In this case, the combination of catch elements on the intermediate bracket and the matching catch elements on the cabin side wall receiver ensures that, on movement of the cabin side wall receiver in the second direction, only discrete positions between the cabin side wall receiver and the intermediate bracket can be assumed. In this way, slipping of the cabin side wall receiver during adjustment is avoided.

The cabin side wall receiver may have at least one damping connector for connection to the at least one cabin side wall paneling.

Vibrations of the cabin side wall paneling relative to the structural component of the aircraft and spacecraft are damped in this way. This prevents noise during operation of the aircraft and spacecraft, and may furthermore avoid damage due to strong vibrations.

Here, the cabin side wall receiver may have two damping connectors, wherein each damping connector is configured for connection to a respective cabin side wall paneling.

The device may be used to attach two cabin side wall panels to a structural component of an aircraft and spacecraft. The vibrations of the two cabin side wall panels may be damped independently of each other by the two damping connectors, since each of the two damping connectors is connected to a respective one of the two cabin side wall panels. This simplifies installation of the cabin side wall panels and costs may be saved.

In another example, the cabin side wall receiver may have at least one holding element for holding at least one cabin light paneling.

The cabin side wall holding component in this case is also configured for fixing mechanical systems to a structural component of an aircraft and spacecraft. Thus a device is provided which bundles several functions in one device. In addition to the holding function for cabin side wall paneling, a holding function for a cabin light paneling is provided. This simplifies installation further, and also further reduces costs since components are saved.

It is furthermore advantageous if, in a further example, the structure holding component has at least one guide element for adjustment and fixing of at least one ventilation outlet opening.

In this way, a further mechanical system, in this case the outlets of a ventilation system for the aircraft and spacecraft, may be held on the structural component by means of the device. Thus a further function is provided by the device, which further reduces the costs and the number of parts used.

Furthermore, as an example, the cabin side wall receiver may have a passage opening which is arranged over the intermediate guide element when the cabin side wall receiver is attached to the intermediate bracket.

The passage opening in the cabin side wall receiver thus creates access to the intermediate guide element of the intermediate bracket when the cabin side wall receiver is attached to the intermediate bracket. This avoids concealing the intermediate guide element, so that firstly the position of the cabin side wall receiver relative to the intermediate bracket can be perceived visually, and secondly—where suitable—the cabin side wall receiver can be locked in the intermediate guide element by means of a fixing element.

The disclosure further concerns an aircraft and spacecraft comprising a structural component; at least one cabin side wall paneling; and at least one device for fixing a cabin side wall paneling to a structural component of an aircraft and spacecraft according to any of the preceding claims, wherein the at least one device for fixing a cabin side wall paneling connects at least one cabin side wall paneling to the structural component.

The advantages and refinements of the aircraft and spacecraft correspond to those of the device as described above. Therefore in this respect, reference is made to the description above.

In an example of the aircraft and spacecraft, it may be provided that the aircraft and spacecraft comprises at least one cabin light paneling, wherein a device for fixing a cabin side wall paneling connects at least one cabin light paneling to the structural component.

Thus a further function is added to the device, which further increases the multifunctionality and saves costs and labor.

In another example, the structure holding component may be made of an electrically conductive material and have a connecting piece for connection to an electrical conductor, wherein the electrical conductor is a ground line for electrical consumers of the aircraft and spacecraft.

In one example, the structure holding component may be made of metal and, via the connection to the structural component which is usually made of metal, provide a ground potential which can function as earthing for electrical consumers in the aircraft and spacecraft. The connection may take place via the connecting piece and an electrical conductor. In this example, a cabin lighting element or its paneling may be earthed via the electrical conductor and the structure holding component. Thus the device fulfills a further function which is provided in addition to the holding function.

Furthermore, in a further example, the aircraft and spacecraft may have at least one ventilation outlet, wherein the device for fixing a cabin side wall paneling connects the at least one ventilation outlet to the structural component.

The device may thus connect a further mechanical system to the structural component. Thus further components are saved and the installation complexity reduced. This further reduces costs.

The disclosure further concerns a method for fixing a cabin side wall paneling to a structural component of an aircraft and spacecraft, wherein the method has the following steps: provision of a device according to any of the preceding claims; fixing of the structure holding component to the structural component; fixing of the intermediate bracket to the adjustable fixing surface, and adjustment of the intermediate bracket by means of the intermediate guide element into a desired position along the first direction; fixing of the cabin side wall receiver to the intermediate bracket and adjustment of the cabin side wall receiver by means of the receiver guide element into a desired position along the second direction; and fixing of the cabin side wall paneling to the cabin side wall receiver.

The advantages and refinements of the method correspond to those of the devices described above and of the aircraft and spacecraft. Therefore in this respect, reference is made to the description above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The disclosed subject matter is described in more detail below with reference to an exemplary embodiment shown in the drawings, which show.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
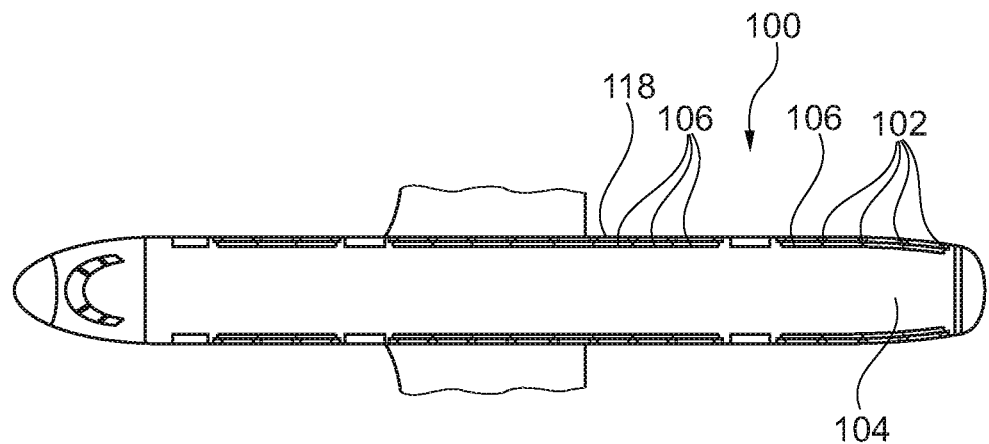
FIG. 1 is a diagrammatic depiction of an aircraft and spacecraft with cabin side wall paneling.

FIG. 1 shows an aircraft and spacecraft designated as a whole with reference sign 100. The aircraft and spacecraft 100 is a passenger aircraft. It may however be a differently configured aircraft and spacecraft 100.

The aircraft and spacecraft 100 has a structural component 102 which spans a frame for the fuselage of the aircraft and spacecraft 100. The structural component 102 in this example is formed as a frame. An outer skin 118 of the aircraft and spacecraft 100 is attached externally to the structural component 102. The fuselage furthermore comprises a cabin compartment 104 for the passengers. Therefore the inner wall of the cabin compartment 104 is equipped with a cabin side wall paneling 106 which is attached from the inside to the structural component 102.

Figure 2A:
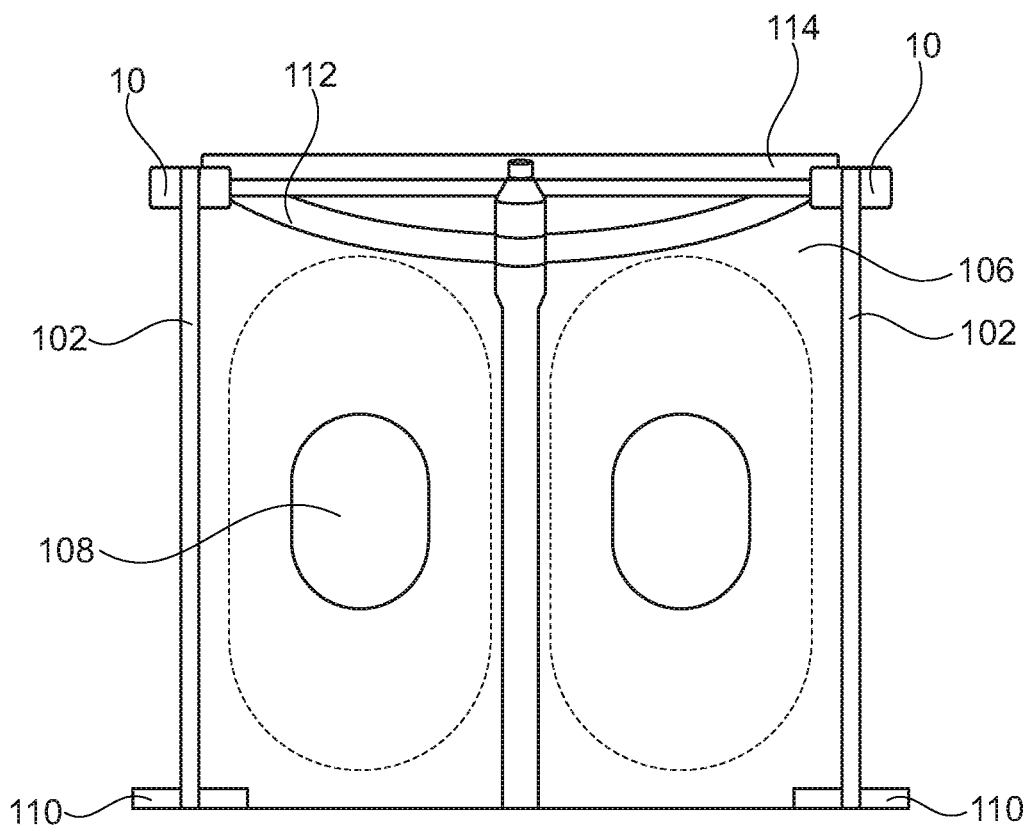
FIGS. 2a and 2b are diagrammatic depictions of a cabin side wall paneling attached to an aircraft and spacecraft, and of cabin light paneling, viewed from the inside and outside.

The cabin side wall paneling 106 and the cabin light paneling 114 are attached to the structural component 102 of the aircraft and spacecraft 100 by means of a device 10 for fixing cabin side wall paneling 106 and cabin light paneling 114 to a structural component 102. For this, FIG. 2a shows a structural component 102 without the outer skin 118. The cabin compartment 104 is behind the windows 108 of the cabin side wall paneling 106. Therefore the side of the cabin side wall paneling 106 and cabin light paneling 114 which is not normally visible is depicted. The device 10 attaches the cabin side wall paneling 106 to the structural component 102 of the aircraft and spacecraft 100, wherein fixing takes place above the window 108. A further connection of the cabin side wall paneling 106 to the structural component 102 may take place below the window 108 using conventional fixing devices 110 already known from the prior art.

Further ventilation outlets 112 run between the cabin side wall paneling 106 and the outer skin 118 of the aircraft and spacecraft 100, wherein the cabin light paneling 114 runs at least partially between the cabin side wall paneling 106 and the structural component 102. The ventilation outlets 112 and the cabin light paneling 114 may also be attached to the structural component 102 by means of the device 10.

Figure 2B:
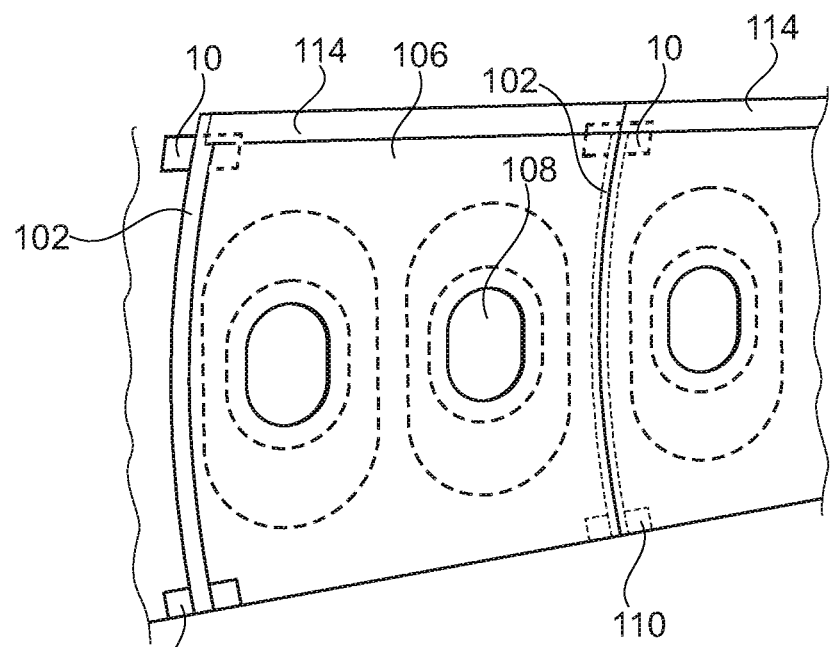

FIG. 2b shows a view of the cabin side wall paneling 106 and cabin light paneling 114 from the cabin compartment 104. When the cabin side wall paneling 106 is attached to the structural component 102, the devices 10 are no longer visible from the interior of the cabin compartment 104.

Figure 3:
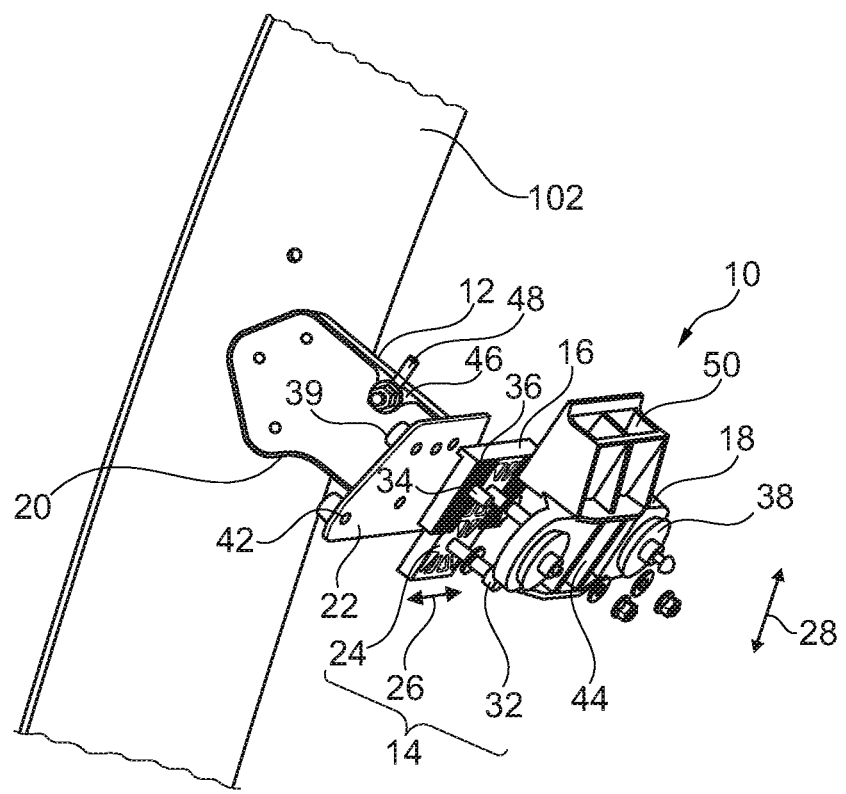
FIG. 3 is a diagrammatic depiction of a device attached to a structural component, for fixing cabin side wall paneling.

FIG. 3 shows an exploded view of the device 10 for fixing cabin side wall paneling 106 to a structural component 102 of an aircraft and spacecraft 100.

The device 10 comprises a structure holding component 12 and a cabin side wall holding component 14. The structure holding component 12 has a structure fixing surface 20. The structure fixing surface 20 of the structure holding component 12 lies on the structural component 102. The structure holding component 12 may be fixedly connected to the structural component 100 by fixing means or otherwise.

The structure holding component 12 furthermore comprises an adjustable fixing surface 22 for fixing the cabin side wall holding component 14 to the structure holding component 12.

The cabin side wall holding component 14 has two subcomponents: an intermediate bracket 16 and a cabin side wall receiver 18.

The intermediate bracket 16 is arranged between the adjustable fixing surface 22 and the cabin side wall receiver 18. The intermediate bracket 16 furthermore comprises an intermediate guide element 24. The intermediate guide element 24 allows the intermediate bracket 16 to be moved in a first direction 26 relative to the adjustable fixing surface 22 and hence relative to the structure holding component 12, which is immovably connected to the structural component 102. The intermediate bracket 16 is locked on the adjustable fixing surface 22 by means of fixing elements 32 for locking the intermediate bracket 16, so that when the fixing element 32 fixes the intermediate bracket 16 to the structure holding component 12, movement can no longer take place in the first direction 26 by means of the intermediate guide element 24. In other words, when the fixing element 32 is released, the intermediate bracket 16 can be moved along the first direction 26.

The intermediate guide element 24 may be configured as a slot which extends in the first direction 26. The fixing element 32 may be guided through the slot and connected to the structure holding component 12.

The cabin side wall receiver 18 comprises a receiver guide element 30. By means of the receiver guide element 30, the cabin side wall receiver 18 can be moved in a second direction 28 relative to the intermediate bracket 16. The second direction 28 is not the same as the first direction 26, i.e. the two directions 26 and 28 are not parallel. The first direction 26 may for example be horizontal relative to the structural component or a floor of the cabin compartment 104, and the second direction 28 may for example be vertical. However, other orientations of the directions 26 and 28 are possible. Furthermore, it is not necessary for the two directions 26 and 28 to stand at right angles to each other.

The cabin side wall receiver 18 furthermore comprises a fixing element 34 for locking the cabin side wall receiver 18 to the intermediate bracket 16. When the fixing element 34 fixes the cabin side wall receiver 18 to the intermediate bracket 16, it is no longer possible for the cabin side wall receiver 18 to move in the second direction 28. As soon as the fixing element 34 is released, the cabin side wall receiver 18 can again be moved in the second direction 28.

The receiver guide element 30 may be configured as a slot which extends in the second direction 28. The fixing element 34 may be guided through the slot and attached to the intermediate bracket 16. Alternatively or additionally, the fixing element 34 may be connected to the structure holding component 12.

By means of the intermediate guide element 24 and the receiver guide element 30, the cabin side wall receiver 18 can be moved relative to the structural component 102 in the first direction 26 and in the second direction 28. This provides an adjustment facility, via which the position of the cabin side wall receiver 18 can be set relative to the structural component 102. In this way, the cabin side wall paneling 106 and the cabin light paneling 114, which are held via the cabin side wall receiver 18, may be oriented precisely on the structural component 102. Furthermore, the cabin side wall paneling 106 and the cabin light paneling 114 may also be oriented relative to each other.

The cabin side wall receiver 18 furthermore comprises a passage opening 44 which is arranged over the intermediate guide element 24 when the cabin side wall receiver 18 is connected to the intermediate bracket 16. The intermediate guide element 24 is then also accessible when the intermediate bracket 16 is arranged between the adjustable fixing surface 22 and the cabin side wall receiver 18.

The structure holding component 12 may be made of metal. Since the structural component 102 is also made of metal, the structure holding component 12 has the same electrical potential. Because of the large mass of the structural component 102, the electrical potential of the structural component 102 may be used as a ground potential. For this, the structure holding component 12 may have a connecting piece 46 for connection to an electrical conductor 48. The electrical conductor 48 may function for example as a ground line for a cabin lighting element of the aircraft and spacecraft 100. Alternatively or additionally, the electrical conductor 48 may also be a ground line for another electrical component of the aircraft and spacecraft 100. Furthermore, alternatively or additionally, the connecting piece 46 may be connected to other electrical conductors (not shown) of other electrical devices of the aircraft and spacecraft 100.

Figure 4A:
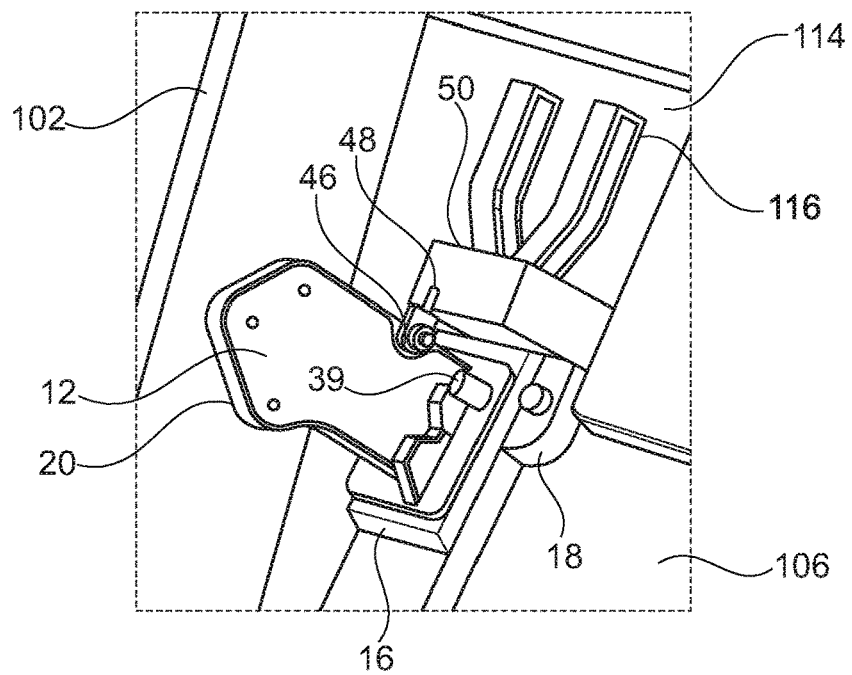
FIGS. 4a and 4b are diagrammatic depictions of various views of the device.

The cabin side wall receiver 18 may comprise receiver elements 50 in which holding elements 116 of the cabin light paneling 114 may be arranged, as shown for example in FIG. 4a. The receiving elements 50 provide a holding function for the cabin light paneling 114.

FIG. 4a furthermore shows that the structure holding component 12 has a receiver 39 for the fixing elements 34 for locking the cabin side wall receiver 18 to the intermediate bracket 16. The fixing elements 34 are received in the receiver 39 and fix the cabin side wall receiver 18 to the structure holding component 12.

Figure 4B:
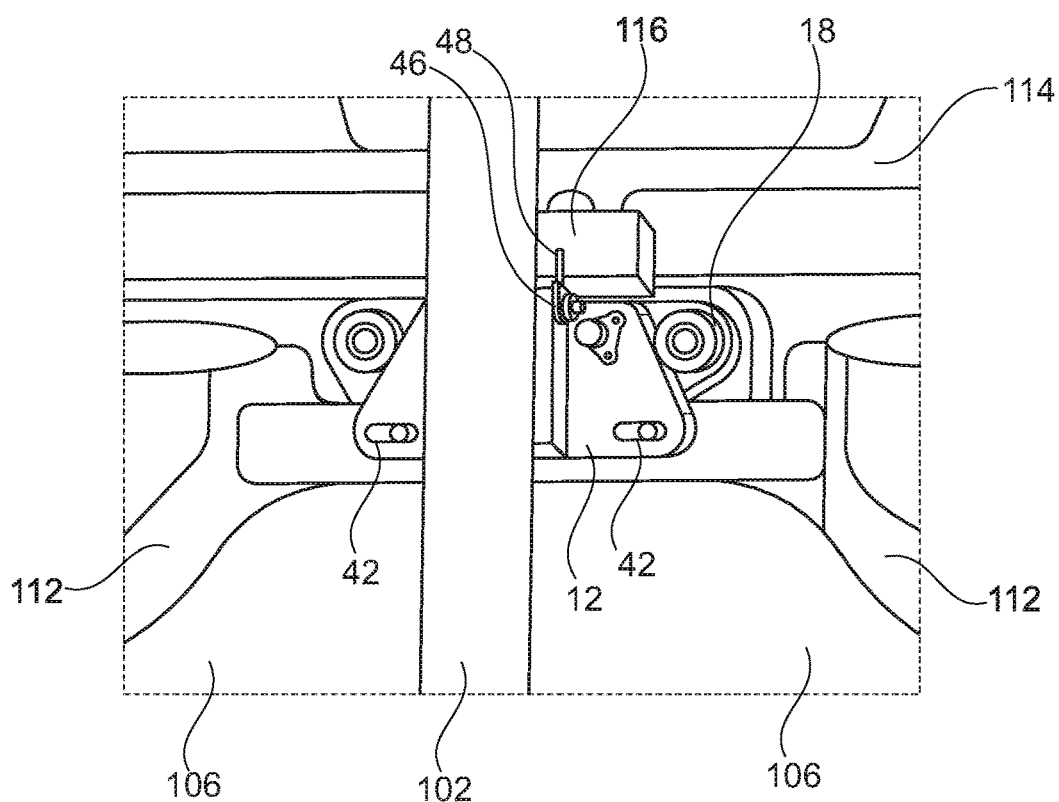

Furthermore, the structure holding component 12 may for example have at least one guide element 42 for adjustment and fixing of at least one ventilation outlet 112. The guide element 42 may be configured as a slot. This is shown as an example in FIG. 4b.

FIGS. 5a to 5d show individual components of the cabin side wall holding component 12, individually and in combination with each other.

Figure 5A:
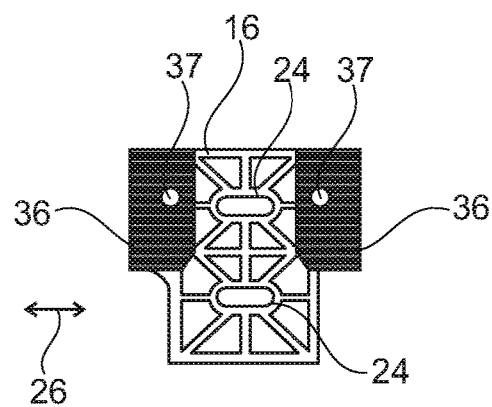
FIGS. 5a-5d are diagrammatic depictions of individual components of the device, individually and in combination with each other.

FIG. 5a shows the intermediate bracket 16, wherein the side facing the observer is the side which comes into contact with the cabin side wall receiver 18 when the cabin side wall receiver 18 is connected to the intermediate bracket 16. The intermediate guide elements 24 are configured as slots which extend along the direction 26.

The intermediate bracket 16 furthermore comprises catch elements 36 which also extend in the direction 26. The catch elements 36 prevent or avoid a movement of the cabin side wall receiver 18 transversely to the first direction 26. In other words, a vertical movement of the cabin side wall receiver 18 leads over the catch elements 36 and can therefore be carried out in discrete steps.

Furthermore, the intermediate bracket 16 has opening 37 for the fixing elements 34. The openings 37 may be receivers or passage openings. If the openings 37 are configured as receivers, the fixing elements 34 may be secured in the openings 37.

Figure 5B:
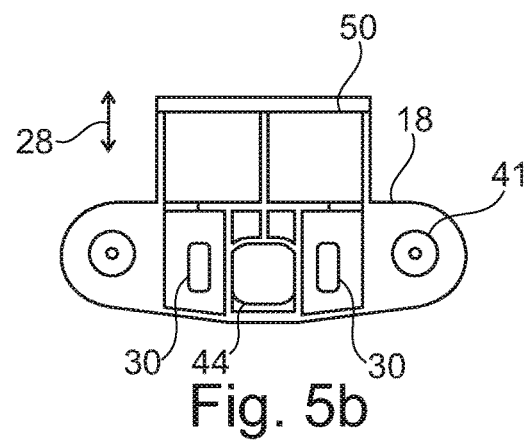

FIG. 5b shows a view of the cabin side wall receiver 18, wherein the back of the cabin side wall receiver 18 is not visible in this depiction, i.e. is facing away from the observer. The back of the cabin side wall receiver 18 may also have catch elements which are configured to match the catch elements 36 of the intermediate bracket 16. The receiver guide element 30 is arranged over the openings 37 in order for the cabin side wall receiver 18 to be connected to the intermediate bracket 16. Furthermore, fixing elements 34 are guided through the receiver guide elements 30 formed as slots, in order to connect the cabin side wall receiver 18 to the intermediate bracket 16.

The cabin side wall receiver 18 furthermore has fixing openings 41 at which damping connectors 38 may be connected to the cabin side wall receiver 18. The damping connectors 38 damp vibrations of the cabin side wall paneling 106.

Figure 5C:
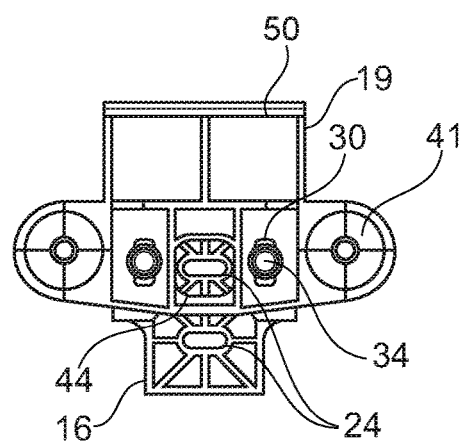

FIG. 5c shows a front view of the cabin side wall holding component 14 in assembled state, i.e. when the cabin side wall receiver 18 is connected to the intermediate bracket 16. The passage opening 24 is arranged over the intermediate bracket 16 such that the intermediate guide element 24, which would be covered by the cabin side wall receiver 18, can be accessed through the passage opening 24. A fixing element 32, which would be guided through the intermediate guide element 24 formed as a slot, would thus be accessible via the passage opening 44.

Figure 5D:
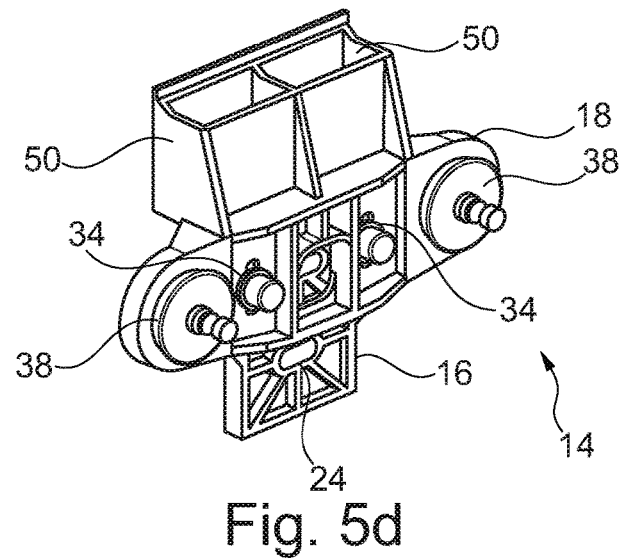

FIG. 5d shows a perspective view of an example of the cabin side wall holding component 14. The damping connectors 38 are arranged and fixed in the fixing openings 41. Furthermore, it is clear from FIGS. 5a to 5d that the cabin side wall receiver 18 can be moved by means of the holder guide elements 30 in the vertical direction relative to the intermediate bracket 16, and hence also relative to the structure holding component 12. By means of the intermediate guide elements 24, the entire cabin side wall holding component 14 can be moved in the horizontal direction relative to the structure holding component 12. This allows adjustment in a plane in which the cabin side wall paneling 106 is arranged.

The embodiment described above is configured for fixing two cabin side wall panels 106 and two cabin light panels 114 at once. For this, the device 10 described above has two damping connectors 38 and two holding elements 50 on which two cabin side wall panels 106 and two cabin light panels 114 can be attached next to each other. The device 10 is thus arranged between the two cabin side wall panels 106 and also between the two cabin light panels 114.

Figure 6:
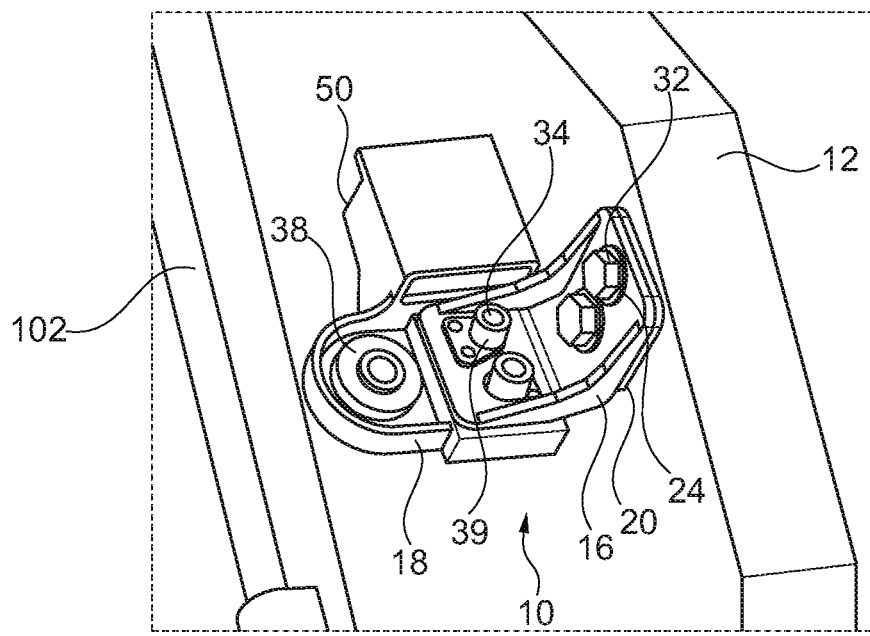
FIG. 6 is a diagrammatic depiction of an alternative embodiment of the device.

FIG. 6 shows an alternative embodiment of the device 10. The alternative embodiment of the device 10 has a single holding element 50 for a cabin side wall paneling 106, and a single damping connector 38 for cabin light paneling 114, in order to absorb vibrations of the single cabin wall paneling 106.

The structure holding component 12 is integrated in a cabin installation which is a structural component 102 of the aircraft and spacecraft 100. The cabin installation may include a toilet or galley side wall.

The cabin side wall holding component 14 here comprises an intermediate bracket 16 formed as an angle bracket. One side of the angle bracket comprises the intermediate guide element 24. The other side of the angle bracket comprises receivers 39 for the fixing elements 34.

Figure 7A:
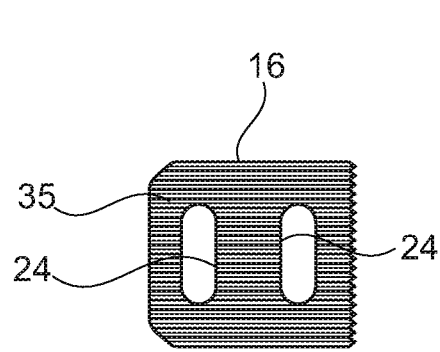
FIGS. 7a-7c are diagrammatic depictions of the individual components of the alternative embodiment, individually and in combination with each other.

FIG. 7a shows that the contact surface of the intermediate bracket 16, which is arranged on the adjustable fixing surface 22, has catch elements 35 which are arranged transversely to the first direction 26 in which the intermediate guide elements 24 extend. On movement of the intermediate bracket 16 in the first direction, therefore only discrete positions between the intermediate bracket 16 and the structure holding component 12 can be assumed. The catch elements 35 provide an additional holding function for the device 10.

Figure 7B:
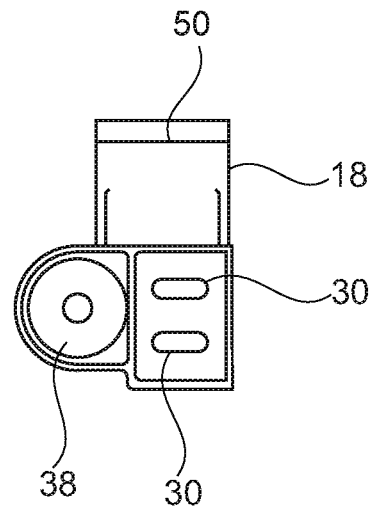

FIG. 7b shows the cabin side wall receiver 18 of the alternative embodiment. In contrast to the embodiment of FIGS. 3 to 5, the cabin side wall receiver 18 of the alternative embodiment has no passage opening 44, since because of the angular form of the intermediate bracket 16, the fixing elements 32 are not covered by the cabin side wall receiver 18. The fixing elements 32 are therefore accessible at any time.

The cabin side wall receiver 18 has a damping connector 38 for holding cabin side wall paneling 106. Furthermore, the cabin side wall receiver 18 has a holding element 50 for cabin light paneling 114.

Figure 7C:
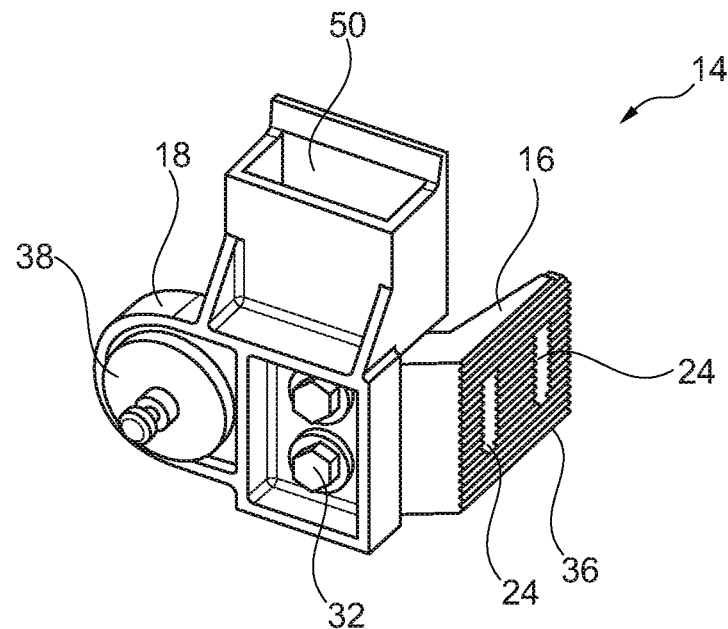

FIG. 7c shows an alternative embodiment of the device 10 in a perspective view from the side on which the cabin side wall paneling 106 is arranged on the cabin side wall receiver 18. In this embodiment, the cabin side wall holder component 14 can be moved vertically by means of the intermediate guide elements 24. Furthermore, the cabin side wall receiver 18 of the cabin side wall holding component 14 can be moved horizontally by means of the receiver guide elements 32. This allows adjustment in a plane in which the cabin side wall panels 106 and cabin light panels 114 are arranged.

Figure 8:
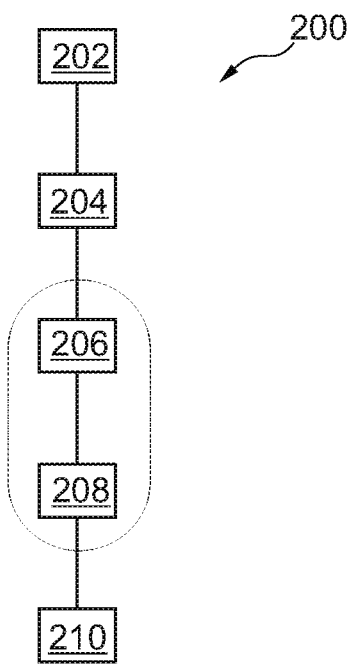
FIG. 8 is a flow diagram to illustrate the method for fixing a cabin side wall paneling to a structural component of an aircraft and spacecraft.

FIG. 8 shows a flow diagram of the method 200 for fixing a cabin side wall paneling and cabin light paneling to a structural component of an aircraft and spacecraft. According to the method 200, in a step 202, a device is provided for fixing a cabin side wall paneling to a structural component of an aircraft and spacecraft, according to the description above.

The structure holding component of the device is attached to the structural component in a step 204. The structure holding component may here, after fixing, be immovably connected to the structural component. The structure holding component has an adjustable fixing surface.

In a step 206, the intermediate bracket of the cabin side wall holding component is attached to the adjustable fixing surface. The intermediate bracket can be moved in the first direction into a desired position by means of the intermediate guide elements before the intermediate bracket is locked to the structure holding component by fixing elements.

In a step 208, the cabin side wall receiver of the cabin side wall holding component is attached to the intermediate bracket. By means of the receiver guide elements, the cabin side wall receiver can be moved in a second direction into a desired position before the cabin side wall receiver is locked to the intermediate bracket by means of the fixing means.

Alternatively, the intermediate bracket and the cabin side wall holding component may be installed simultaneously in one step as a preassembly, i.e. as a preassembled component. In other words, step 206 and 208 are installed together in this case. The preassembly is in this case then pre-adjusted.

In a further step 210, a cabin side wall paneling and a cabin light paneling may be attached to the cabin side wall receiver. For this, the cabin side wall receiver may have damping connectors and holding elements on which the cabin side wall paneling and cabin light paneling can be held.

The cabin side wall receiver may also be configured to attach a single cabin side wall panel and a single cabin light panel, or two cabin side wall panels and cabin light panels to the structural component.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device for fixing cabin side wall paneling and cabin light paneling to a structural component of an aircraft and spacecraft, the device comprising: a structure holding component; and a cabin side wall holding component; wherein the structure holding component has a structure fixing surface for fixing the structure holding component to the structural component, and an adjustable fixing surface for fixing the cabin side wall holding component; wherein the cabin side wall holding component has an intermediate bracket and a cabin side wall receiver for fixing at least one cabin side wall paneling; wherein the intermediate bracket is arranged between the adjustable fixing surface and the cabin side wall receiver; wherein the intermediate bracket has an intermediate guide element which guides the intermediate bracket in a first direction relative to the adjustable fixing surface, and the cabin side wall receiver has a receiver guide element which guides the cabin side wall receiver in a second direction relative to the intermediate bracket; wherein the intermediate bracket has a fixing element for locking the intermediate bracket on the adjustable fixing surface; and wherein the cabin side wall receiver has a fixing element for locking the cabin side wall receiver on the intermediate bracket.

2. The device according to claim 1, wherein the intermediate guide element is formed as a slot which extends in the first direction, wherein the fixing element for locking the intermediate bracket is arranged in the slot and is stationary relative to the adjustable fixing surface.

3. The device according to claim 1, wherein the receiver guide element is formed as a slot which extends in the second direction, wherein the fixing element for locking the cabin side wall receiver is arranged in the slot and is stationary relative to the intermediate bracket.

4. The device according to claim 1, wherein the intermediate bracket has a plurality of catch elements which extend transversely to the first direction and are formed to match catch elements on the adjustable fixing surface.

5. The device according to claim 1, wherein the intermediate bracket has a plurality of catch elements which extend in the first direction and are formed to match catch elements on the cabin side wall receiver.

6. The device according to claim 1, wherein the cabin side wall receiver has at least one damping connector for connection to the at least one cabin side wall paneling.

7. The device according to claim 6, wherein the cabin side wall receiver has two damping connectors, wherein each damping connector is configured for connection to a respective cabin side wall paneling.

8. The device according to claim 1, wherein the cabin side wall receiver has at least one holding element for holding at least one cabin light paneling.

9. The device according to claim 1, wherein the structure holding component has at least one guide element for adjustment and fixing of at least one ventilation outlet.

10. The device according to claim 1, wherein the cabin side wall receiver has a passage opening which is arranged over the intermediate guide element when the cabin side wall receiver is attached to the intermediate bracket.

11. An aircraft and spacecraft comprising: a structural component; at least one cabin side wall paneling; and at least one device for fixing a cabin side wall paneling to a structural component of an aircraft and spacecraft; wherein the at least one device for fixing a cabin side wall paneling connects at least one cabin side wall paneling to the structural component; wherein the at least one device for fixing a cabin side wall paneling comprises a structure holding component and a cabin side wall holding component; wherein the structure holding component has a structure fixing surface for fixing the structure holding component to the structural component, and an adjustable fixing surface for fixing the cabin side wall holding component; wherein the cabin side wall holding component has an intermediate bracket and a cabin side wall receiver for fixing at least one cabin side wall paneling; wherein the intermediate bracket is arranged between the adjustable fixing surface and the cabin side wall receiver; wherein the intermediate bracket has an intermediate guide element which guides the intermediate bracket in a first direction relative to the adjustable fixing surface, and the cabin side wall receiver has a receiver guide element which guides the cabin side wall receiver in a second direction relative to the intermediate bracket; wherein the intermediate bracket has a fixing element for locking the intermediate bracket on the adjustable fixing surface; and wherein the cabin side wall receiver has a fixing element for locking the cabin side wall receiver on the intermediate bracket.

12. The aircraft and spacecraft according to claim 11, wherein the aircraft and spacecraft comprises at least one cabin light paneling, wherein the at least one device for fixing a cabin side wall paneling connects at least one cabin light paneling to the structural component.

13. The aircraft and spacecraft according to claim 12, wherein the structure holding component is made of an electrically conductive material and has a connecting piece for connection to an electrical conductor, wherein the electrical conductor is a ground line for a cabin lighting element of the aircraft and spacecraft.

14. The aircraft and spacecraft according to claim 11, wherein the aircraft and spacecraft has at least one ventilation outlet, wherein the at least one device for fixing a cabin side wall paneling connects the at least one ventilation outlet to the structural component.

15. A method for fixing a cabin side wall paneling and a cabin light paneling to a structural component of an aircraft and spacecraft, wherein the method comprises:

providing a device comprising a structure holding component and a cabin side wall holding component, wherein the structure holding component has a structure fixing surface for fixing the structure holding component to the structural component, and an adjustable fixing surface for fixing the cabin side wall holding component; the cabin side wall holding component has an intermediate bracket and a cabin side wall receiver for fixing at least one cabin side wall paneling; the intermediate bracket is arranged between the adjustable fixing surface and the cabin side wall receiver; the intermediate bracket has an intermediate guide element which guides the intermediate bracket in a first direction relative to the adjustable fixing surface, and the cabin side wall receiver has a receiver guide element which guides the cabin side wall receiver in a second direction relative to the intermediate bracket; the intermediate bracket has a fixing element for locking the intermediate bracket on the adjustable fixing surface; and the cabin side wall receiver has a fixing element for locking the cabin side wall receiver on the intermediate bracket;

fixing the structure holding component to the structural component;

fixing the intermediate bracket to the adjustable fixing surface, and adjusting the intermediate bracket by the intermediate guide element into a desired position along the first direction;

fixing the cabin side wall receiver to the intermediate bracket and adjustment of the cabin side wall receiver by the receiver guide element into a desired position along the second direction; and fixing the cabin side wall paneling and cabin light paneling to the cabin side wall receiver.

* * * * *